US011834594B2

(12) United States Patent
Bishop et al.

(10) Patent No.: US 11,834,594 B2
(45) Date of Patent: *Dec. 5, 2023

(54) METHODS FOR DRILLING WELLBORES USING THINNER COMPOSITIONS

(71) Applicant: Chevron Phillips Chemical Company LP, The Woodlands, TX (US)

(72) Inventors: Marshall D. Bishop, Conroe, TX (US); Johnnie E. Anderson, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/407,139

(22) Filed: Aug. 19, 2021

(65) Prior Publication Data

US 2021/0388253 A1    Dec. 16, 2021

Related U.S. Application Data

(63) Continuation of application No. 16/843,217, filed on Apr. 8, 2020, now Pat. No. 11,098,230.

(60) Provisional application No. 62/831,386, filed on Apr. 9, 2019.

(51) Int. Cl.
*C09K 8/03* (2006.01)
*C09K 8/20* (2006.01)

(52) U.S. Cl.
CPC .................................. *C09K 8/203* (2013.01)

(58) Field of Classification Search
CPC ................... C09K 8/203; C09K 8/03
See application file for complete search history.

(56) References Cited

U.S. PATENT DOCUMENTS

| | | | |
|---|---|---|---|
| 2,393,166 A | 1/1946 | Hoeppel | |
| 2,605,221 A * | 7/1952 | Hoeppel | C09K 8/16 507/145 |
| 2,935,473 A * | 5/1960 | Ellis | C09K 8/203 71/25 |
| 3,171,811 A | 3/1965 | Keirstead | |
| 3,344,063 A | 9/1967 | Stratton | |
| 3,391,173 A | 7/1968 | Stratton | |
| 3,446,733 A | 5/1969 | Shell | |
| 3,479,287 A | 11/1969 | Floyd | |
| 3,537,991 A | 11/1970 | Parker | |
| 4,110,226 A | 8/1978 | Swanson | |
| 4,240,505 A | 12/1980 | Swanson | |
| 4,246,124 A | 1/1981 | Swanson | |
| 4,300,634 A | 11/1981 | Clampitt | |
| 4,323,123 A | 4/1982 | Swanson | |
| 4,389,320 A | 6/1983 | Clampitt | |
| 4,440,228 A | 4/1984 | Swanson | |
| 4,618,433 A | 10/1986 | Allison, III | |
| 4,704,214 A * | 11/1987 | Russell | C09K 8/203 507/108 |
| 4,842,770 A | 6/1989 | Patel | |
| 4,951,921 A | 8/1990 | Stahl | |
| 5,032,296 A | 7/1991 | Patel | |
| 5,080,890 A | 1/1992 | Ueno | |
| 5,186,257 A | 2/1993 | Stahl | |
| 5,399,548 A * | 3/1995 | Patel | C09K 8/12 507/224 |
| 5,631,313 A | 5/1997 | Bishop | |
| 6,030,928 A | 2/2000 | Stahl | |
| 2006/0116296 A1 | 6/2006 | Kippie | |
| 2006/0194700 A1 | 8/2006 | Gatlin | |
| 2007/0249504 A1 | 10/2007 | Ballard | |
| 2009/0247428 A1 * | 10/2009 | Duncum | C09K 8/28 507/119 |
| 2011/0136702 A1 | 6/2011 | Harris | |
| 2015/0021027 A1 | 1/2015 | Chapman | |
| 2015/0021098 A1 | 1/2015 | Kippie | |

FOREIGN PATENT DOCUMENTS

CN    1026755060 A    9/2012

OTHER PUBLICATIONS

Drill-Thin product data sheet, 2022.*
International Search Report and the Written Opinion of the International Searching Authority in PCT/US2020/27179 dated Jul. 15, 2020. pp. 1-8.
Extended European Search Report for 20787116.1, dated Nov. 22, 2022 (8 pp.).

* cited by examiner

*Primary Examiner* — Kumar R Bhushan
(74) *Attorney, Agent, or Firm* — Eversheds Sutherland (US) LLP

(57) ABSTRACT

Techniques for drilling wellbores are described. The techniques include a) introducing a drilling fluid composition into a borehole defined by a formation; b) introducing a thinner composition including at least one tannin and at least one metal salt into the borehole; and c) contacting the thinner composition and the drilling fluid composition in the borehole, wherein the at least one tannin and at least one metal salt are not complexed ex situ. The at least one metal salt includes at least one copper salt, at least one zinc salt, or both at least one copper salt and at least one zinc salt.

25 Claims, 2 Drawing Sheets

METHODS FOR DRILLING WELLBORES USING THINNER COMPOSITIONS

CROSS REFERENCE TO RELATED APPLICATIONS

This application is a continuation of U.S. patent application Ser. No. 16/843,217, filed Apr. 8, 2020, which claims the benefit of U.S. Provisional Patent Application No. 62/831,386, filed Apr. 9, 2019, each of which is incorporated herein by reference in its entirety.

TECHNICAL FIELD

This disclosure relates to methods for drilling wellbores, and more specifically, using thinner compositions for drilling natural resource wells.

BACKGROUND

Wells can be drilled to extract natural resources such as oil, gas, or water. A wellbore is surrounded by a formation, for example, shale or clay, which can influence the stability of the wellbore. For example, the formation can exert pressure on the wellbore, or fluids from the formation can enter the wellbore. A formation can include permeable regions, and fluids introduced into the wellbore can enter the permeable regions, resulting in fluid loss. Such fluid loss can affect drilling efficiency, can entail replacement of drilling fluids, and can affect the stability of the formation.

Drilling compositions, for example, drilling fluids or drilling muds, can be used to facilitate the drilling of wellbores. Drilling fluid or mud can be distributed and circulated along a wellbore to provide functions such as cooling and lubrication of drilling equipment, or to remove cuttings and clear the borehole. In addition to performing these functions, drilling compositions can also assist in promoting formation stability.

The rheology of drilling fluids affects their performance. For example, maintaining the viscosity of a drilling fluid below an upper threshold can provide better drilling fluid performance. Additives, for example, thinners, can be used to control the rheology of drilling fluids. However, there remains a need for improvements in thinners, for example, in reducing formulation costs while maintaining performance over existing thinners.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, this disclosure describes techniques for drilling wellbores. The techniques include a) introducing a drilling fluid composition into a borehole defined by a formation; b) introducing a thinner composition including at least one tannin and at least one metal salt into the borehole; and c) contacting the thinner composition and the drilling fluid composition in the borehole. The at least one tannin and at least one metal salt are not complexed ex situ. The at least one metal salt includes at least one copper salt, at least one zinc salt, or both at least one copper salt and at least one zinc salt.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

Figure 1:
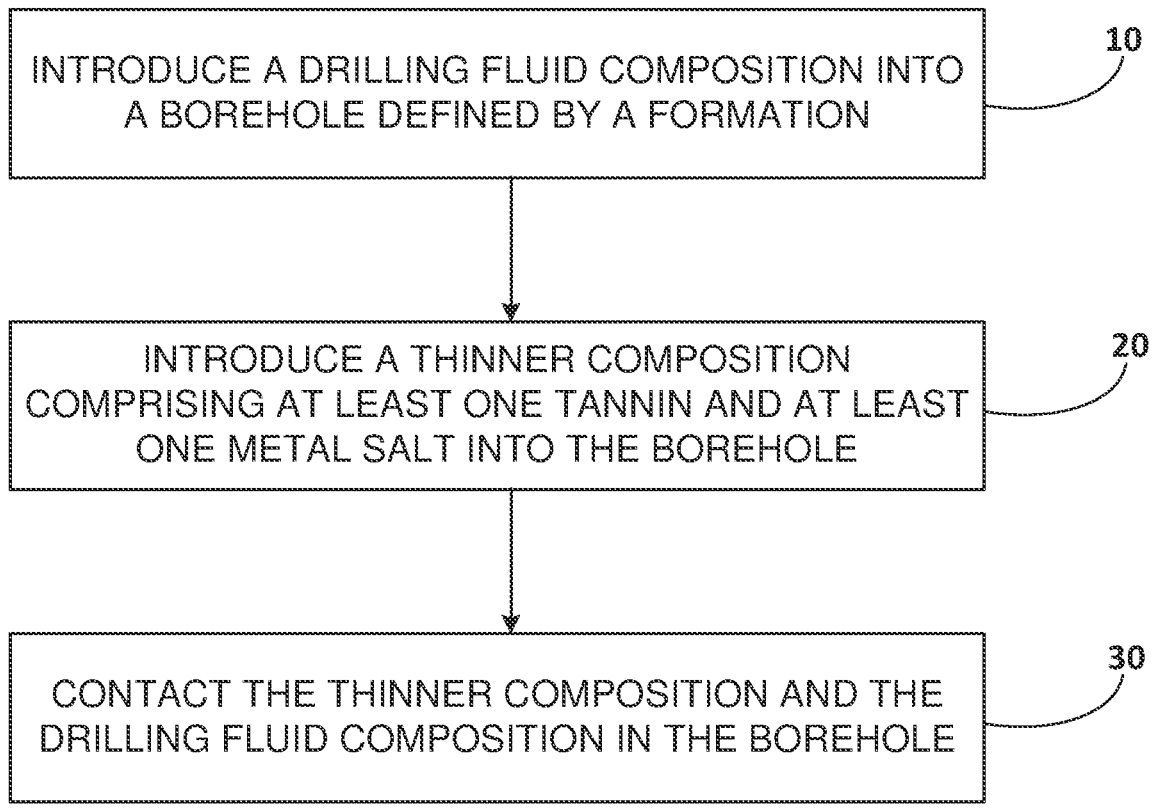
FIG. 1 is a flow diagram illustrating an embodiment of a technique for drilling a wellbore.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso. As a representative example, if Applicants disclose in an aspect of the disclosure that the thinner composition includes from about 1% by weight to about 10% by weight of copper sulfate, this range should be interpreted as encompassing about 1% and about 10% by weight of copper sulfate.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

The term "dry mix" or "dry blend" refers to a dry or substantially dry composition including two or more components that are substantially dry, except for minor amounts of moisture contained within the solid components used to formulate the dry mix or dry blend. That is, no water or liquid is added to the blend or mixture of particulate or granular solid components. The dry mix or dry blend may include compounds that include bound water of hydration (for example, $FeSO_4 \cdot H_2O$, or the like).

The term "tannin" as used herein shall mean both natural tannings and modified tannins, and refers to the class of polyphenolic molecules or species, including but not limited to phlobaphenes, derived or extracted from trees (i.e. the bark) or plants, or substituted analogs thereof, as understood by the person of ordinary skill. The term "modified tannin" refers to a natural tannin modified by a process such as hydrolysis, sulfonation, methylation, acetylation, or condensation.

The term "quebracho" refers to a powdered form of tannins such as tannic acid derived or extracted from the quebracho tree, *Schinopsis, Jodina* or *Aspidosperma* species, as understood by the person of ordinary skill.

The term "not complexed ex situ", "substantially ex situ unreacted", "substantially ex situ uncomplexed", and the like refer to the combination of ingredients such as the combination of the dry tannins and metal salts ingredients disclosed herein, to which no heat is added or any other attempt to cause the reaction or complexation of the tannins with the metal salt. In some aspect, these terms refer to the combination of dry ingredients to which no solvent is added in an attempt to cause the reaction or complexation of the tannins with the metal salt, until the ingredients are added to the drilling fluid. Therefore, these terms refer to a substantially unreacted or uncomplexed state outside a site of use, for example, outside a wellbore.

The term "substituted" when used to describe a group, for example, when referring to a substituted analog of a particular group, is intended to describe the compound or group wherein any non-hydrogen moiety formally replaces hydrogen in that group or compound and is intended to be non-limiting. A compound or group can also be referred to herein as "unsubstituted" or by equivalent terms such as "non-substituted," which refers to the original group or compound. "Substituted" is intended to be non-limiting and include inorganic substituents or organic substituents as specified and as understood by one of ordinary skill in the art, unless otherwise specified or excluded.

The term "metal salt" as used herein refers to a compound formed with the hydrogen atom of an acid is replaced by a metal atom, as understood by the person of ordinary skill. Examples of metal salts include but are not limited to halide (for example, chloride or bromide), sulfate, acetate, acetate hydroxide, nitrate, phosphate, hydrogen phosphate, and the like, compounds of a metal such as copper, zinc, chromium, iron, tin, and the like.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to techniques for drilling wellbores. Controlling the rheology of drilling muds (also referred to as drilling fluids) can avoid problems associated with excessive viscosity. Thinner compositions can be added to drilling muds to control the rheology, for example, by reducing the viscosity. The effectiveness of a thinner composition can depend on one or more factors, such as salinity, solids content, chemical composition, pH, and temperature. Some additives can result in good control of rheology, but are not preferred due to their environmental effects or due to their relatively high cost.

Thinner compositions can include one or more tannins, for example, sulfomethylated quebracho. It has been shown that better effectiveness of tannins can be achieved by adding chromium salts or tin salts (also referred to as stannous salts). However, chromium salts, for example, salts including $Cr^{6+}$, may be associated with environmental effects. Stannous or tin salts may be relatively expensive, and may have other deterring economic effects.

It has been found that zinc and copper salts can be used in thinner compositions as partial replacements or complete replacements for chromium salts and/or stannous salts when combined with tannins or tannin sources such as quebracho, while providing comparable or better thinning properties, for example, in water-based drilling muds. One or both of zinc salts or copper salts can also be economically effective.

Metal salts may react with or complex with tannins in thinner compositions. For example, some thinner compositions may include complexed tannins and chromium salts. It has surprisingly been found that using a thinner composition including a dry blend, which includes substantially ex situ unreacted or uncomplexed tannins and metal salts, provides comparable or better thinning properties, compared to compositions including complexed components. The components of thinner compositions according to the disclosure may complex in situ, for example, after the composition is introduced into a wellbore under wellbore conditions, including allowing the composition to contact, disperse with or mix with the drilling mud.

In aspects, this disclosure describes techniques for drilling wellbores. The techniques include a) introducing a drilling fluid composition into a borehole defined by a formation; b) introducing a thinner composition including at least one tannin and at least one metal salt into the borehole; and c) contacting the thinner composition and the drilling fluid composition in the borehole. The at least one tannin and at least one metal salt are not complexed ex situ, for example, they are provided in a dry mix. The at least one metal salt includes at least one copper salt, at least one zinc salt, or both (a combination) at least one copper salt and at least one zinc salt.

Turning now to the figure, FIG. 1 is a flow diagram illustrating an embodiment of a technique for drilling a wellbore. The technique includes introducing a drilling fluid composition into a borehole defined by a formation (10). The formation may include a subterranean formation, for example, including a reservoir of a natural resource such as oil or gas. The borehole can be a pilot hole or a wellbore being drilled with drilling apparatus such as a drill bit. The drilling fluid composition can include a water-based composition and/or an oil-based composition. The drilling fluid can include water, one or more clays, and additives. The clays can include bentonite, sepiolite, attapulgite, polymeric clays, or any suitable clay. The additives can include thickeners or viscosifiers, deflocculants, lubricants, fluid loss controllers, inert solids, weighting agents, or any other suitable drilling fluid additives, for example, barite, calcium sulfate, or sodium chloride.

The technique includes introducing a thinner composition including at least one tannin and at least one metal salt into the borehole (20). In some aspects, introducing the thinner composition into the borehole (10) includes (i) introducing a tannin composition including the at least one tannin into the borehole; and (ii) introducing a metal salt composition including the at least one metal salt into the borehole. In some aspects, the tannin composition is introduced into the borehole before or at the same time as introducing the metal salt composition into the borehole.

In some aspects, the at least one tannin includes tannic acid, quebracho, sulfomethylated quebracho, or sulfonated tannin. In some aspects, the at least one tannin includes sulfomethylated quebracho. In some aspects, the at least one tannin consists essentially of sulfomethylated quebracho.

In some aspects, the thinner composition includes at least about 50% by weight of the at least one tannin. For example, the thinner composition includes at least about 50% by weight of sulfomethylated quebracho. In some aspects, the thinner composition includes at least about 60% by weight of sulfomethylated quebracho. In some aspects, the thinner composition includes at least about 70% by weight of sulfomethylated quebracho. In some aspects, the thinner composition includes about 70% by weight of sulfomethylated quebracho.

The at least one tannin and at least one metal salt are not complexed ex situ. For example, the at least one tannin and at least one metal salt are not reacted with or complexed with each other or other components of the thinner composition before the thinner composition is introduced into a site of use, for example, the borehole. In an aspect, the at least one tannin and at least one metal salt do not form a reaction product, for example, in which complexation occurs. The at least one tannin and at least one metal salt may tend to react or complex after being introduced into the drilling fluid in the borehole. Thus, the at least one tannin and at least one metal salt may only form a complex or reaction product in situ.

The at least one metal salt can include at least one copper salt, at least one zinc salt, or both at least one copper salt and at least one zinc salt. In some aspects, the at least one metal salt includes at least one copper salt and at least one zinc salt. In some aspects, the at least one copper salt includes copper sulfate. In some aspects, the at least one zinc salt includes zinc sulfate, zinc chloride, or a combination of zinc sulfate and zinc chloride. In some aspects, the metal salt consists essentially of at least one copper salt. In some aspects, the metal salt consists essentially of copper sulfate. In some aspects, the metal salt consists essentially of at least one zinc salt. In some aspects, the metal salt consists essentially of zinc chloride. In some aspects, the metal salt consists essentially of zinc sulfate. In some aspects, the metal salt consists essentially of at least one copper salt and at least one zinc salt. In some aspects, the thinner composition does not include any metal salt other than at least one copper salt and/or at least one zinc salt, and a ferrous salt, for example, ferrous sulfate. In some aspects, the thinner composition does not include any chromium salt. In some aspects, the thinner composition does not include any stannous salt. In some aspects, the thinner composition does not include any chromium salt or any stannous salt. In some aspects, the thinner composition includes one or both of a chromium salt and/or a stannous salt. The chromium salt may include chrome acetate, for example, chromium(III) acetate hydroxide (CAS #39430-51-8). The stannous salt may include stannous sulfate.

In some aspects, the thinner composition includes at least about 1% by weight of copper sulfate. In some aspects, the thinner composition includes at least about 3% by weight of copper sulfate. In some aspects, the thinner composition includes at least about 5% by weight of copper sulfate. In some aspects, the thinner composition includes from about 1% by weight to about 10% by weight of copper sulfate. In some aspects, the thinner composition includes from about 2% by weight to about 8% by weight of copper sulfate. In some aspects, the thinner composition includes from about 3% by weight to about 7% by weight of copper sulfate. For example, in some aspects, the thinner composition can include copper sulfate in a concentration of about 1.0% by weight, about 1.5% by weight, about 2.0% by weight, about 2.5% by weight, about 3.0% by weight, about 3.5% by weight, about 4.0% by weight, about 4.5% by weight, about 5.0% by weight, about 5.5% by weight, about 6.0% by weight, about 6.5% by weight, about 7.0% by weight, about 7.5% by weight, or about 8.0% by weight.

In some aspects, the thinner composition includes at least about 5% by weight of the at least one zinc salt. For example, the thinner composition may include at least about 5% by weight of zinc chloride or zinc sulfate. In some aspects, the thinner composition includes at least about 10% by weight of zinc sulfate heptahydrate.

In some aspects, introducing the thinner composition into the borehole (20) can occur after or at the same time as introducing the drilling fluid composition into a borehole (10). In other aspects, introducing the thinner composition into the borehole (20) occurs before introducing the drilling fluid composition into a borehole (10). In still further aspects, introducing the thinner composition into the borehole (20) can be substantially continuous with introducing the drilling fluid composition into a borehole (10). For example, streams of the thinner composition and the drilling fluid composition can be continuously introduced into the borehole, for example, through pipes, channels, or the likes.

In some aspects, the thinner composition includes a dry mix of the at least one tannin and at least one metal salt. In some such aspects, introducing the thinner composition into the borehole (20) can include introducing a powder flow, particulate flow, air or gas suspended flow, solid flow, conveyor flow, screw flow, or another dry stream of a substantially dry thinner composition into the drilling fluid. In some such aspects, introducing the thinner composition into the borehole (20) can include introducing the at least one tannin and at least one metal salt into the borehole simultaneously, such as in a dry mix, or alternatively, introducing the at least one tannin and at least one metal salt in series into a drilling fluid, a borehole, or a drilling fluid as it is being introduced to the borehole.

In some aspects, the thinner composition further includes ferrous sulfate. In some aspects, the thinner composition includes at least about 5% by weight of ferrous sulfate. In some aspects, the thinner composition includes at least about 9% by weight of ferrous sulfate. In some aspects, the thinner composition includes about 9% by weight of ferrous sulfate.

In some aspects, the thinner composition further includes a dispersant, for example, lignite, causticized lignite, potassium lignite, or lignosulfonate, or any other suitable dispersant. In some aspects, the dispersant includes causticized lignite.

In some aspects, the thinner composition includes at least about 8% by weight of causticized lignite. In some aspects, the thinner composition includes about 8% by weight of causticized lignite. In some aspects, the thinner composition includes at least about 15% by weight of causticized lignite.

In some aspects, the thinner composition includes ferrous sulfate, causticized lignite, and at least one metal salt selected from copper sulfate, zinc sulfate, and/or zinc chloride.

In some aspects, the thinner composition includes about 9% by weight of ferrous sulfate, about 70% by weight of sulfomethylated quebracho, and at least about 8% by weight of causticized lignite. In some such aspects, the balance of the thinner composition includes at least one metal salt selected from copper sulfate, zinc sulfate, and/or zinc chloride.

In some aspects, the thinner composition has a thinning efficiency of at least about 30%, as measured according to Protocol A, as described elsewhere in this disclosure. In some such aspects, the thinner composition has a thinning efficiency of at least about 40%, or at least about 50%, or at least about 60%, or at least about 70%, or at least about 80%, or at least about 90%.

Figure 2:
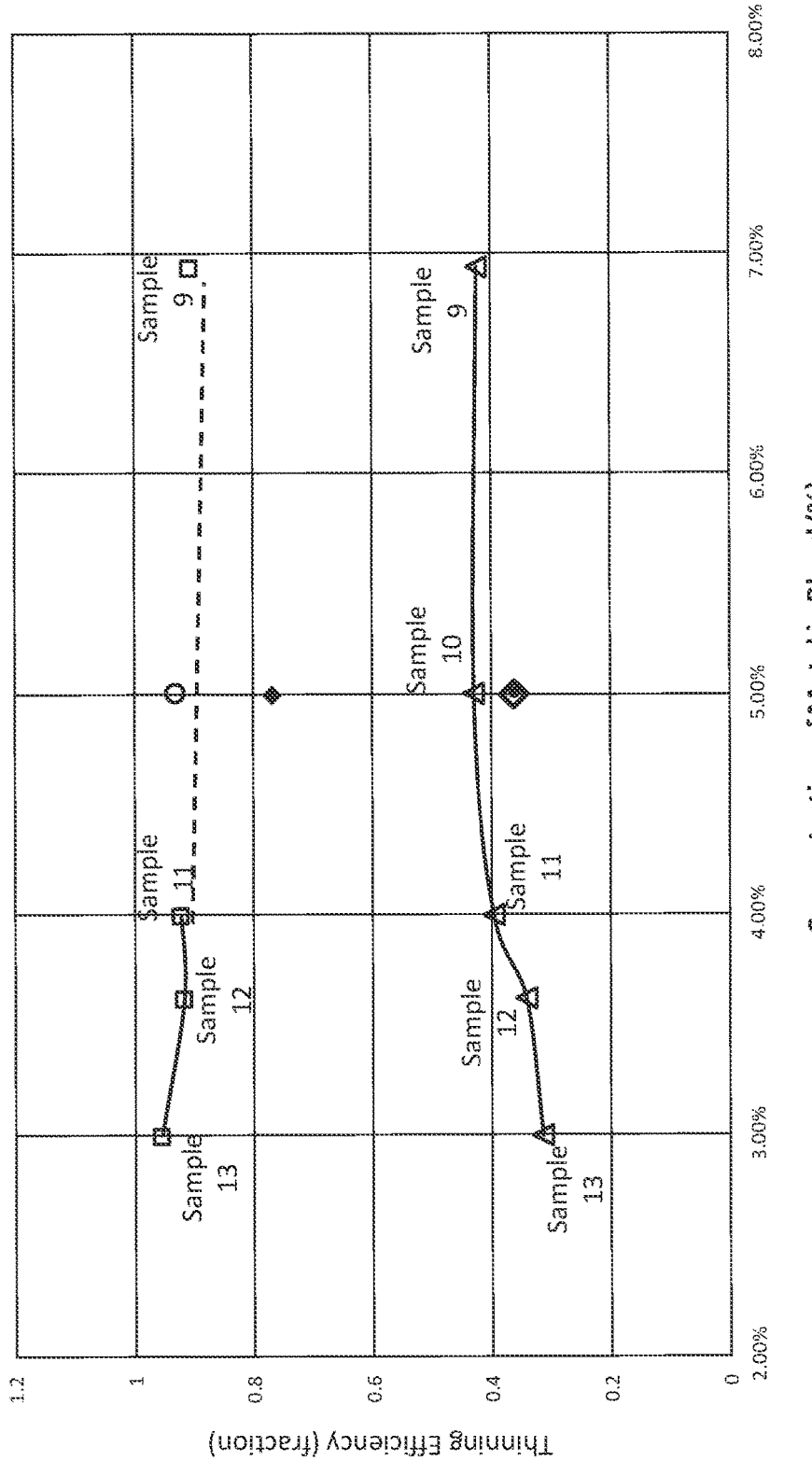
FIG. 2 is a chart illustrating a comparison of the thinning efficiency of thinning compositions without copper sulfate with thinning compositions including different concentrations of copper sulfate.

In some aspects, the technique of FIG. 2 includes contacting the thinner composition and the drilling fluid composition in the borehole (30). For example, the thinner composition and the drilling fluid composition may combine, contact, disperse or mix within the borehole, for example resulting from flow, circulation, or recirculation of the drilling fluid with the thinner composition. The at least one tannin and at least one metal salt may react or complex in the borehole in response to the contacting (30).

In some aspects, the technique of FIG. 2 further includes drilling the formation to define or extend a wellbore. For example, the introducing the drilling fluid (10) can be substantially simultaneously performed with drilling the formation. In some such aspects, the introducing the thinner composition (20) and contacting the thinner composition and the drilling fluid composition in the borehole (30) can be performed substantially simultaneously and continuously with the introducing the drilling fluid (10) as a continuous operation. The drilling can be stopped when a suitable depth of the wellbore is achieved.

Thus, techniques according to the disclosure can be used to control rheological properties of drilling muds while drilling wellbores.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Different types of base mud were prepared. Test muds were prepared by adding different amounts and types of thinners to the base muds and hot rolling at different temperatures. The rheological properties of the different muds without and with different thinners was compared. For example, the thinning efficiency of the thinners was determined based on the relative reduction in the yield point of the base mud compared to the test muds, as discussed herein.

Example 1: Preparation of First Base Mud

The first base mud (also referred to as base fluid) was prepared using a Model 50 Lab Dispersator (Premier Mill Corporation, Reading, PA) or equivalent. The base fluid (mud) was conditioned dynamically for 24 hours at room temperature.

The base mud was prepared according to the formulation shown in Table 1 following the order of addition and mixing times.

The drilling fluid was prepared in, or transferred to, an appropriately sized Nalgene carboy. The carboy was placed on a bottle roller and rolled at least 24 hours to allow the fluid to completely equilibrate. The mud was considered stable at this point and was stored for several months for use as needed. It is preferable to keep the bottle rolling while in storage.

TABLE 1

Preparation of the first base mud formulation

| Component | Grams | Mixing Time (min) | Specific Gravity | Vol (mL) | Concentration lbm/bbl |
|---|---|---|---|---|---|
| Deionized $H_2O$ | 3000 | 5 | 1.0045 | 3005.5 | 309.73 |
| NaCl (Reagent Grade) | 19 | | | | |
| API Standard Evaluation Base Clay | 700 | 30 | 2.50 | 280.00 | 72.26 |
| API Test Calibration Bentonite | 250 | 30 | 2.65 | 94.34 | 25.81 |
| $CaSO_4$ (Reagent Grade) | 38 | 5 | 2.32 | 16.38 | 3.92 |
| Total | 4007 | | 1.180 | 3396.18 | |

Example 2: Preparation of Test Muds

Test muds were prepared by adding different thinners to the base mud of Example 1. The base mud was mixed for a minimum of 5 minutes using a Model 9B Multimixer (Sterling Multi Products, Inc., Prophetstown, Illinois) equipped with a 9B29X impeller blade or equivalent prior to removing samples for preparation of the individual test sample. The formulation of individual test sample is shown in Table 2. The thinner concentrations for testing at the two temperatures (150° F. and 300° F.) are also shown in Table 2.

TABLE 2

Preparation of the individual test samples

| Materials | Amount (g) | Mixing Time (min) |
|---|---|---|
| Base Fluid (Mud) | 395 | — |
| API Test Calibration Barite | 50 | 10 |
| Thinner | 1 lbm/bbl (150° F.), 3 lbm/bbl (300° F.) | 1 |
| NaOH | to pH 10* | 10 |

*pH was not adjusted in the comparative base mud sample without thinner when determining thinning efficiency of the test samples.

Individual test mud samples were conditioned dynamically for 16 hours in roller oven at 150° F. or 300° F. with the hot roll cells pre-pressured to 200 psi with nitrogen. After conditioning, muds were cooled to room temperature and the pH of the muds, excluding blanks, was adjusted to 10.

The sample thinner formulation added to the respective test muds are shown in Table 3. The thinning efficiencies were evaluated as discussed with reference to Example 3.

TABLE 3

Preparation of the thinner formulations

| Thinner Formulation | CL wt. % | MS wt. % | Metal Salt | Thinning efficiency 1 lbm/bbl, 150° F. | Thinning efficiency 3 lbm/bbl, 300° F. |
|---|---|---|---|---|---|
| Sample 1 (Drill-Thin ®) | 16.0 | 5.00 | stannous sulfate | 36.3% | 76.6% |
| Sample 2 | 16.2 | 4.79 | stannous pyrophosphate | 29.6% | |
| Sample 3 | 12.5 | 8.50 | manganese sulfate monohydrate | −29.6% | |
| Sample 4 | 13.1 | 7.95 | potassium permanganate | 30.7% | 82.6% |
| Sample 5 | 8.8 | 12.15 | zinc sulfate heptahydrate | 30.7% | 80.8% |
| Sample 6 | 15.2 | 5.76 | zinc chloride | 35.2% | 67.1% |
| Sample 7 | — | — | Sample 6 + a small amount of copper sulfate | 41.9% | |
| Sample 8 | 15.2 | 6.21 | sodium stannate | | 84.4% |
| Sample 9 | 14.1 | 6.94 | copper sulfate | 42.5% | 90.4% |
| Sample 10 | 16.0 | 5.00 | copper sulfate | 43.0% | |
| Sample 11 | 17.0 | 4.00 | copper sulfate | 39.7% | 92.2% |
| Sample 12 | 17.4 | 3.62 | copper sulfate | 34.1% | 91.6% |
| Sample 13 | 18.0 | 3.00 | copper sulfate | 31.3% | 95.5% |
| Sample 14 (Desco ®) | 18.0 | 3.00 | chrome acetate | 36.3% | 93.3% |

CL: Causticized Lignite.
MS: Metal Salt

Each sample thinner formulation included 70 wt. % of sulfomethylated quebracho and 9 wt. % of ferrous sulfate as a dry unreacted/uncomplexed blend. The formulation of Sample 1 was similar to that of a commercially available thinner formulation, Drill-thin® (Chevron Phillips Chemical, The Woodlands, TX). The formulation of Sample 1 was similar to that of a commercially available thinner formulation, Drill-Thin® thinner (Chevron Phillips Chemical, The Woodlands, TX). The formulation of Sample 14 was similar to that of a commercially available formulation, Desco® (Chevron Phillips Chemical, The Woodlands, TX).

Example 3: Evaluation of Rheological Properties of Base Mud and Test Muds

The muds were individually redispersed or mixed by mixing in the Multimixer for 5 minutes and hot rolled to either 150° F. or 300° F. The viscosity was measured at 600 rpm, 300 rpm, 200 rpm, 100 rpm, 6 rpm, and 3 rpm (in terms of deflection dial readings) using a Model 35 Viscometer (Fann Instrument Company, Houston, Texas) or equivalent at the target temperature. $\Theta_{rpm}$ is the angle of deflection observed at a specific rpm. The apparent viscosity (AV in cP) was calculated as per standard API practice, using Equation 1. The plastic viscosity (PV, in cP) was calculated as per standard API practice, using Equation 2. The yield point (YP, in lbs/100 ft$^2$) was calculated as per standard API practice, using Equation 3. The protocol of Example 3 is "Protocol A".

$$AV = \Theta_{600}/2 \quad \text{(Equation 1)}$$

$$PV = \Theta_{600} - \Theta_{300} \quad \text{(Equation 2)}$$

$$YP = \Theta_{300} - PV \quad \text{(Equation 3)}$$

The thinning efficiency was calculated using Equation 4.

$$\% \text{ Thinning Efficiency} = 100 \times (YP_b - YP_t)/YP_b \quad \text{(Equation 4)}$$

In EQUATION 2, $YP_b$ is the YP of base mud at pH 7.53, and $YP_t$ is the YP of mud treated with thinner, that is, the test mud, which has been pH adjusted to pH 10.0. A higher thinning efficiency correlates directly to better thinning performance. Thus, Protocol A may be used to determine the thinning efficiency of a thinner composition.

The rheological properties of the base mud and test muds including sample thinner formulations at 150° F. are presented in Tables 4A and 4B. Sample 8 was not tested at 150° F. The rheological properties of the base mud and test muds including sample thinner formulations at 300° F. are presented in Tables 5A and 5B. The base mud at pH 10 and Samples 2, 3, and 10 were not tested at 300° F.

TABLE 4A

Rheological properties of the base mud and test muds at 150° F.

| Rheological Properties | Base Mud pH 7.53 | Base Mud pH adjusted to 10 | Base Mud + Sample 1 | Base Mud + Sample 2 | Base Mud + Sample 3 | Base Mud + Sample 4 | Base Mud + Sample 5 | Base Mud + Sample 6 |
|---|---|---|---|---|---|---|---|---|
| $\Theta_{600}$ | 108.5 | 150 | 75 | 81 | 122 | 80 | 83 | 80 |
| $\Theta_{300}$ | 99 | 134.5 | 66 | 72 | 119 | 71 | 72.5 | 69 |
| $\Theta_{200}$ | 92 | 127 | 62.5 | 68 | 105 | 68 | 70 | 66 |
| $\Theta_{100}$ | 90 | 119 | 57 | 62 | 97 | 62 | 64 | 60 |
| $\Theta_6$ | 72 | 91 | 41 | 45 | 69 | 44 | 46 | 42 |
| $\Theta_3$ | 70.5 | 88 | 39 | 42.5 | 68 | 42 | 44 | 40 |
| AV | 54.25 | 75 | 37.5 | 40.5 | 61 | 40 | 41.5 | 40 |
| PV | 9.5 | 15.5 | 9 | 9 | 3 | 9 | 10.5 | 11 |
| YP | 89.5 | 119 | 57 | 63 | 116 | 62 | 62 | 58 |
| Thinning Efficiency | — | −33.0% | 36.3% | 29.6% | −29.6% | 30.7% | 30.7% | 35.2% |

TABLE 4B

Rheological properties of the base mud and test muds at 150° F.

| Rheological Properties | Base Mud + Sample 7 | Base Mud + Sample 9 | Base Mud + Sample 10 | Base Mud + Sample 11 | Base Mud + Sample 12 | Base Mud + Sample 13 | Base Mud + Sample 14 |
|---|---|---|---|---|---|---|---|
| $\Theta_{600}$ | 72 | 68.5 | 69 | 70 | 75 | 76.5 | 71 |
| $\Theta_{300}$ | 62 | 60 | 60 | 62 | 67 | 69 | 64 |
| $\Theta_{200}$ | 59 | 58 | 58 | 58.5 | 64 | 66.5 | 60 |
| $\Theta_{100}$ | 54 | 54 | 53 | 53.5 | 60 | 62 | 55 |
| $\Theta_6$ | 40 | 38.5 | 39 | 40 | 43 | 45 | 40 |
| $\Theta_3$ | 39 | 38 | 38 | 38.5 | 41 | 42.5 | 38.5 |
| AV | 36 | 34.25 | 34.5 | 35 | 37.5 | 38.25 | 35.5 |
| PV | 10 | 8.5 | 9 | 8 | 8 | 7.5 | 7 |
| YP | 52 | 51.5 | 51 | 54 | 59 | 61.5 | 57 |
| Thinning Efficiency | 41.9% | 42.5% | 43.0% | 39.7% | 34.1% | 31.3% | 36.3% |

TABLE 5A

Rheological properties of the base mud and test muds at 300° F.

| Rheological Properties | Base Mud pH 7.53 | Base Mud + Sample 1 | Base Mud + Sample 4 | Base Mud + Sample 5 | Base Mud + Sample 6 | Base Mud + Sample 7 |
|---|---|---|---|---|---|---|
| $\Theta_{600}$ | 96.5 | 34.5 | 33.5 | 35 | 42.5 | 72 |
| $\Theta_{300}$ | 90 | 27 | 24 | 25.5 | 35 | 62 |
| $\Theta_{200}$ | 88.5 | 24 | 20 | 21.5 | 32.5 | 59 |
| $\Theta_{100}$ | 83 | 20.5 | 16.5 | 17.5 | 28.5 | 54 |
| $\Theta_6$ | 65 | 14.5 | 10 | 10.5 | 21 | 40 |
| $\Theta_3$ | 63 | 14 | 10 | 10.5 | 21 | 39 |
| AV | 48.25 | 17.25 | 16.75 | 17.5 | 21.25 | 36 |
| PV | 6.5 | 7.5 | 9.5 | 9.5 | 7.5 | 10 |
| YP | 83.5 | 19.5 | 14.5 | 16 | 27.5 | 52 |
| Thinning Efficiency | — | 76.6% | 82.6% | 80.8% | 67.1% | 41.9% |

TABLE 5B

Rheological properties of the base mud and test muds at 300° F.

| Rheological Properties | Base Mud + Sample 8 | Base Mud + Sample 9 | Base Mud + Sample 11 | Base Mud + Sample 12 | Base Mud + Sample 13 | Base Mud + Sample 14 |
|---|---|---|---|---|---|---|
| $\theta_{600}$ | 27 | 20 | 21 | 20.5 | 18 | 19 |
| $\theta_{300}$ | 20 | 14 | 14 | 14 | 11 | 12.5 |
| $\theta_{200}$ | 17 | 11.5 | 11.5 | 11.5 | 8.5 | 10 |
| $\theta_{100}$ | 13 | 8.5 | 8.5 | 8.5 | 6 | 7 |
| $\theta_6$ | 7.5 | 3 | 3.5 | 3.5 | 2 | 2.5 |
| $\theta_3$ | 7.5 | 3 | 3.5 | 3.5 | 2 | 2.5 |
| AV | 13.5 | 10 | 10.5 | 10.25 | 9 | 9.5 |
| PV | 7 | 6 | 7 | 6.5 | 7 | 6.5 |
| YP | 13 | 8 | 7 | 7.5 | 4 | 6 |
| Thinning Efficiency | 84.4% | 90.4% | 92.2% | 91.6% | 95.5% | 93.3% |

Selected results from Tables 4A, 4B, 5A, and 5B are presented in FIG. 2 as fractional thinning efficiency values. FIG. 2 is a chart illustrating a comparison of the thinning efficiency of thinning compositions without copper sulfate with thinning compositions including different concentrations of copper sulfate.

Thus, thinner formulations including copper sulfate and zinc chloride, alone or in combination, have similar or better thinning efficiency than thinner formulations including chromium or tin salts. Further, formulations including copper and zinc salts had surprisingly better thinning efficiency than formulations including other metal salts such as chromium, tin, or manganese salts.

Example 4: Preparation of a Second Base Mud and Evaluation of Rheological Properties of Second Base Mud and Test Muds A second base mud was prepared, using the components set forth in Table 6, in the order and with the mixing times shown, using the general procedure according to Example 1.

TABLE 6

Preparation of the second base mud formulation

| Component | Quantity (grams) | Mixing Time (min) |
|---|---|---|
| Distilled water | 571.8 (mL) | — |
| Bentonite | 30 | 10 |
| Sodium Chloride | 2 | 5 |
| Calcium sulfate | 1 | 5 |
| NaOH, 100% | 1 | 3 |
| API Base Clay | 80 | 10 |
| Barite | 291.48 | 10 |

Thinner formulations of Sample 1, Sample 11, Sample 12, Sample 13, and Sample 14 of Example 2 (Table 3) were added at a concentration of 1 lbm/bbl to the second base mud to prepare test muds. Rheological properties were established at 50° F. and after hot rolling at 200° F., using the technique described with reference to EXAMPLE 3. The results are set forth in Table 7 (50° F.) and Table 8 (200° F.). In Table 7 and Table 8, the thinning efficiency is measured relative to the second base mud at the pH shown in each table.

TABLE 7

Rheological properties of the second base mud and test muds at 50° C.

| Rheological Properties | Second Base Mud | Second Base Mud + Sample 1 | Second Base Mud + Sample 11 | Second Base Mud + Sample 12 | Second Base Mud + Sample 13 | Second Base Mud + Sample 14 |
|---|---|---|---|---|---|---|
| pH | 10.46 | 10.16 | 10.50 | 10.78 | 10.41 | 10.33 |
| $\theta_{600}$ | 296.9 | 16.0 | 16.6 | 19.4 | 18.0 | 18.7 |
| $\theta_{300}$ | 279.1 | 8.4 | 8.4 | 9.5 | 9.0 | 9.2 |
| $\theta_{200}$ | 276.2 | 6.4 | 6.0 | 7.0 | 6.3 | 6.4 |
| $\theta_{100}$ | 261.7 | 3.5 | 3.3 | 3.7 | 3.4 | 4.0 |
| PV | 17.8 | 7.6 | 8.2 | 9.9 | 9.0 | 9.5 |
| YP | 261.3 | 0.8 | 0.2 | −0.4 | 0.0 | −0.3 |
| 10 second gel strength (lbs/100 ft$^2$) | 141.6 | 0.6 | 0.1 | 0.7 | 1.0 | 0.3 |
| 10 minute gel strength (lbs/100 ft$^2$) | 160.4 | 5.4 | 5.1 | 8.6 | 10.8 | 12.0 |
| Thinning Efficiency | — | 99.7 | 99.9 | 100.2 | 100.0 | 100.1 |

TABLE 8

Rheological properties of the second base mud after hot rolling for 16 hours at 200° C. and tested muds at 50° C.

| Rheological Properties | Second Base Mud | Second Base Mud + Sample 1 | Second Base Mud + Sample 11 | Second Base Mud + Sample 12 | Second Base Mud + Sample 13 | Second Base Mud + Sample 14 |
|---|---|---|---|---|---|---|
| pH | 10.86 | 9.50 | 10.46 | 10.72 | 10.14 | 10.52 |
| $\theta_{600}$ | 42.9 | 23.4 | 33.2 | 30.9 | 31.9 | 28.4 |
| $\theta_{300}$ | 42.4 | 12.8 | 21.8 | 19.5 | 21.1 | 18.2 |
| $\theta_{200}$ | 42.2 | 11.0 | 22.8 | 19.8 | 19.8 | 14.1 |
| $\theta_{100}$ | 42.0 | 8.1 | 21.8 | 14.1 | 18.4 | 11.6 |
| PV | 0.5 | 10.6 | 11.4 | 11.4 | 10.8 | 10.2 |
| YP | 41.9 | 2.2 | 10.4 | 8.1 | 10.3 | 8.0 |
| 10 second gel strength (lbs/100 ft$^2$) | 74.7 | 3.1 | 9.3 | 6.9 | 8.8 | 4.9 |
| 10 minute gel strength (lbs/100 ft$^2$) | 132.4 | 24.8 | 41.3 | 32.3 | 36.2 | 35.8 |
| Thinning Efficiency | — | 94.7 | 75.2 | 80.7 | 75.4 | 80.9 |

Example 5: Preparation of a Third Base Mud and Evaluation of Rheological Properties of Third Base Mud and Test Muds A third base mud was prepared by adding 200 mL deionized water to 2 L of the second base mud of Example 4.

Thinner formulations of Sample 1 and Sample 10 of Example 2 were added at a concentration of 1 lbm/bbl to the third base mud to prepare test muds. Rheological properties were established at 50° C., and after hot rolling at 200° C., using the technique described with reference to Example 3, and with a Model 900 Viscometer (OFITE®, Houston, TX). The results are set forth in TABLE 9 below.

TABLE 9

Rheological properties of the third base mud and test muds at 50° C. and after hot rolling for 16 hours at 200° C. fluid properties were measured at 50° C.

| Rheological Properties | Third Base Mud | Third Base Mud + Sample 1 | Third Base Mud + Sample 10 | Third Base Mud | Third Base Mud + Sample 1 | Third Base Mud + Sample 10 |
|---|---|---|---|---|---|---|
| | | 50° C. | | | Hot rolled 200° C. measured at 50° C. | |
| pH | 10.73 | 10.33 | 10.43 | 10.59 | 10.30 | 10.99 |
| $\theta_{600}$ | 328.4 | 18.7 | 19.4 | 65.7 | 21.2 | 29.1 |
| $\theta_{300}$ | 324.2 | 8.6 | 9.4 | 60.6 | 18.2 | 27.9 |
| $\theta_{200}$ | 315.9 | 5.4 | 6.2 | 47.5 | 13.0 | 23.6 |
| $\theta_{100}$ | 294.2 | 2.8 | 3.3 | 47.2 | 12.2 | 23.0 |
| PV | 4.2 | 10.1 | 10.0 | 5.1 | 3.0 | 1.2 |
| YP | 320.0 | −1.5 | −0.6 | 55.5 | 15.2 | 26.7 |
| 10 second gel strength (lbs/100 ft$^2$) | 148.4 | 0.0 | 0.5 | 8.9 | 11.7 | 24.6 |
| 10 minute gel strength (lbs/100 ft$^2$) | 159.6 | 8.6 | 10.7 | 68.9 | 36.4 | 39.3 |
| Thinning Efficiency | — | 100.5 | 100.2 | — | 72.6 | 51.9 |

Example 6: Preparation of a Fourth Base Mud and Evaluation of Rheological Properties of Third Base Mud and Test Muds A fourth base mud was prepared by adding 300 mL deionized water to 2 L of the second base mud of Example 4. Thinner formulations of Sample 1, Sample 10, Sample 11, Sample 13, and Sample 14 of Example 2 were added at a concentration of 1 lbm/bbl to the fourth base mud to prepare test muds. Rheological properties were established at 50° F. and after hot rolling at 200° F., using the technique described with reference to Example 3 and with a Model 900 Viscometer (OFITE®, Houston, TX). The results are set forth in Table 10 (50° C.) and Table 11 (after hot rolling at 200° C.) below.

TABLE 10

Rheological properties of the fourth base mud and test muds at 50° C.

| Rheological Properties | Fourth Base Mud | Fourth Base Mud + Sample 1 | Fourth Base Mud + Sample 10 | Fourth Base Mud + Sample 11 | Fourth Base Mud + Sample 13 | Fourth Base Mud + Sample 14 |
|---|---|---|---|---|---|---|
| pH | 10.49 | 10.32 | 10.35 | 10.49 | 10.33 | 10.36 |
| $\theta_{600}$ | 323.9 | 21.0 | 22.3 | 22.7 | 21.9 | 24.7 |
| $\theta_{300}$ | 302.6 | 9.7 | 10.8 | 10.3 | 10.1 | 12.2 |
| $\theta_{200}$ | 296.0 | 7.0 | 7.8 | 7.4 | 7.2 | 7.7 |
| $\theta_{100}$ | 282.6 | 3.8 | 4.1 | 4.0 | 4.0 | 5.3 |
| PV | 21.3 | 11.3 | 11.5 | 12.4 | 11.8 | 12.5 |
| YP | 281.3 | −1.6 | −0.7 | −2.1 | −1.7 | −0.3 |
| 10 second gel strength (lbs/100 ft$^2$) | 157.3 | 0.2 | 0.3 | 0.0 | 0.4 | 0.6 |
| 10 minute gel strength (lbs/100 ft$^2$) | 167.0 | 7.4 | 13.5 | 12.6 | 14.5 | 16.9 |
| Thinning Efficiency | — | 100.6 | 100.2 | 100.7 | 100.6 | 100.1 |

TABLE 11

Rheological properties of the fourth base mud hot rolled for 16 hours at 200° C., with rheology measured at 50° C.

| Rheological Properties | Fourth Base Mud | Fourth Base Mud + Sample 1 | Fourth Base Mud + Sample 10 | Fourth Base Mud + Sample 11 | Fourth Base Mud + Sample 13 | Fourth Base Mud + Sample 14 |
|---|---|---|---|---|---|---|
| pH | 10.52 | 10.56 | 10.43 | 10.49 | 10.52 | 10.55 |
| $\theta_{600}$ | 64.3 | 26.6 | 34.9 | 33.5 | 38.8 | 37.1 |
| $\theta_{300}$ | 51.7 | 21.8 | 23.4 | 21.9 | 33.7 | 25.8 |
| $\theta_{200}$ | 49.6 | 14.9 | 24.3 | 22.6 | 31.6 | 22.8 |
| $\theta_{100}$ | 49.0 | 14.1 | 22.9 | 21.2 | 30.5 | 21.0 |

TABLE 11-continued

Rheological properties of the fourth base mud hot rolled for 16 hours at 200° C., with rheology measured at 50° C.

| Rheological Properties | Fourth Base Mud | Fourth Base Mud + Sample 1 | Fourth Base Mud + Sample 10 | Fourth Base Mud + Sample 11 | Fourth Base Mud + Sample 13 | Fourth Base Mud + Sample 14 |
|---|---|---|---|---|---|---|
| PV | 12.6 | 4.8 | 11.5 | 11.6 | 5.1 | 11.3 |
| YP | 39.1 | 17.0 | 11.9 | 10.3 | 28.6 | 14.5 |
| 10 second gel strength (lbs/100 ft$^2$) | 67.7 | 10.3 | 10.9 | 11.4 | 23.3 | 17.6 |
| 10 minute gel strength (lbs/100 ft$^2$) | 152.8 | 41.3 | 38.0 | 37.1 | 42.3 | 41.6 |
| Thinning Efficiency | — | 56.5 | 69.6 | 73.7 | 26.9 | 62.9 |

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "comprising" certain components or steps, but alternatively, can "consist essentially of" or "consist of" those components or steps unless specifically stated otherwise.

Aspect 1. A method for drilling a wellbore, the method comprising:
 a) introducing a drilling fluid composition into a borehole defined by a formation;
 b) introducing a thinner composition comprising at least one tannin and at least one metal salt into the borehole; and
 c) contacting the thinner composition and the drilling fluid composition in the borehole;
 wherein the at least one tannin and at least one metal salt are not complexed ex situ, and
 wherein the at least one metal salt comprises at least one copper salt, at least one zinc salt, or a combination of at least one copper salt and at least one zinc salt.

Aspect 2. The method of Aspect 1, wherein introducing the thinner composition into the borehole occurs after or at the same time as introducing the drilling fluid composition into the borehole.

Aspect 3. The method of Aspect 1, wherein introducing the at least one tannin into the borehole occurs at the same time as introducing the at least one metal salt into the borehole.

Aspect 4. The method of any one of Aspects 1 to 3, wherein the thinner composition comprises a dry mix of the at least one tannin and the at least one metal salt.

Aspect 5. The method of any one of Aspects 1 to 3, wherein introducing the thinner composition into the borehole comprises:
 introducing a tannin composition comprising the at least one tannin into the borehole; and
 introducing a metal salt composition comprising the at least one metal salt into the borehole.

Aspect 6. The method of Aspect 5, wherein the tannin composition is introduced into the borehole before or at the same time as introducing the metal salt composition into the borehole.

Aspect 7. The method of any one of Aspects 1 to 6, wherein the at least one tannin comprises sulfomethylated quebracho.

Aspect 8. The method of any one of Aspects 1 to 7, wherein the at least one metal salt comprises at least one copper salt and at least one zinc salt.

Aspect 9. The method of any one of Aspects 1 to 8, wherein the at least one copper salt comprises copper sulfate.

Aspect 10. The method of any one of Aspects 1 to 9, wherein the at least one zinc salt comprises zinc sulfate, zinc chloride, or a combination of zinc sulfate and zinc chloride.

Aspect 11. The method of any one of Aspects 1 to 10, wherein the thinner composition further comprises ferrous sulfate.

Aspect 12. The method of any one of Aspects 1 to 11, wherein the thinner composition further comprises causticized lignite.

Aspect 13. The method of any one of Aspects 1 to 7, wherein the thinner composition comprises ferrous sulfate, causticized lignite, and at least one metal salt selected from copper sulfate, zinc sulfate, and/or zinc chloride.

Aspect 14. The method of any one of Aspects 1 to 13, wherein the thinner composition comprises at least about 1% by weight of copper sulfate.

Aspect 15. The method of any one of Aspects 1 to 13, wherein the thinner composition comprises at least about 3% by weight of copper sulfate.

Aspect 16. The method of any one of Aspects 1 to 13, wherein the thinner composition comprises at least about 5% by weight of copper sulfate.

Aspect 17. The method of any one of Aspects 1 to 13, wherein the thinner composition comprises from about 1% by weight to about 10% by weight of copper sulfate.

Aspect 18. The method of any one of Aspects 1 to 13, wherein the thinner composition comprises from about 2% by weight to about 8% by weight of copper sulfate.

Aspect 19. The method of any one of Aspects 1 to 13, wherein the thinner composition comprises from about 3% by weight to about 7% by weight of copper sulfate.

Aspect 20. The method of any one of Aspects 1 to 13, wherein the thinner composition comprises at least about 5% by weight of zinc chloride.

Aspect 21. The method of any one of Aspects 1 to 13, wherein the thinner composition comprises at least about 10% by weight of zinc sulfate heptahydrate.

Aspect 22. The method of any one of Aspects 1 to 21, wherein the thinner composition comprises at least about 60% by weight of sulfomethylated quebracho.

Aspect 23. The method of any one of Aspects 1 to 21, wherein the thinner composition comprises at least about 70% by weight of sulfomethylated quebracho.

Aspect 24. The method of any one of Aspects 1 to 23, wherein the thinner composition comprises at least about 8% by weight of causticized lignite.

Aspect 25. The method of any one of Aspects 1 to 23, wherein the thinner composition comprises at least about 15% by weight of causticized lignite.

Aspect 26. The method of any one of Aspects 1 to 25, wherein the thinner composition comprises at least about 5% by weight of ferrous sulfate.

Aspect 27. The method of any one of Aspects 1 to 25, wherein the thinner composition comprises at least about 9% by weight of ferrous sulfate.

Aspect 28. The method of any one of Aspects 1 to 23, wherein the thinner composition comprises about 9% by weight of ferrous sulfate, about 70% by weight of sulfomethylated quebracho, and at least about 8% by weight of causticized lignite.

Aspect 29. The method of any one of Aspects 1 to 17, wherein the thinner composition has a thinning efficiency of at least about 30%, as measured according to Protocol A.

Aspect 30. The method of any one of Aspects 1 to 18, further comprising drilling the formation to define or extend a wellbore.

We claim:

1. A method for drilling a wellbore, the method comprising:
   a) introducing a drilling fluid composition into a borehole defined by a formation;
   b) introducing a thinner composition comprising at least one tannin and at least three metal salts into the borehole; and
   c) contacting the thinner composition and the drilling fluid composition in the borehole,
   wherein the at least one tannin and the at least three metal salts are not complexed ex situ, and
   wherein the at least three metal salts comprise at least one copper salt, at least one zinc salt, and at least one iron salt.

2. The method of claim 1, wherein introducing the thinner composition into the borehole occurs after or at the same time as introducing the drilling fluid composition into the borehole.

3. The method of claim 1, wherein introducing the at least one tannin into the borehole occurs at the same time as introducing the at least three metal salts into the borehole.

4. The method of claim 1, wherein the thinner composition comprises a dry mix of the at least one tannin and the at least three metal salts.

5. The method of claim 1, wherein introducing the thinner composition into the borehole comprises:
   introducing a tannin composition comprising the at least one tannin into the borehole; and introducing a metal salt composition comprising the at least three metal salts into the borehole.

6. The method of claim 5, wherein the tannin composition is introduced into the borehole before or at the same time as introducing the metal salt composition into the borehole.

7. The method of claim 1, wherein the at least one tannin comprises at least about 60% by weight of sulfomethylated quebracho.

8. The method of claim 7, wherein the thinner composition comprises at least about 70% by weight of sulfomethylated quebracho.

9. The method of claim 8, wherein at least one iron salt in the thinner composition comprises about 9% by weight of ferrous sulfate.

10. The method of claim 1, wherein the at least one zinc salt comprises at least about 5% by weight of zinc sulfate, zinc chloride, or a combination of zinc sulfate and zinc chloride in the thinner composition.

11. The method of claim 1, wherein at least one iron salt in the thinner composition comprises ferrous sulfate.

12. The method of claim 11, wherein the thinner composition comprises at least about 5% by weight of ferrous sulfate.

13. The method of claim 12, wherein the thinner composition comprises at least about 9% by weight of ferrous sulfate.

14. The method of claim 11, wherein the at least one zinc salt comprises at least about 5% by weight of zinc sulfate, zinc chloride, or a combination of zinc sulfate and zinc chloride in the thinner composition.

15. The method of claim 1, wherein the thinner composition further comprises at least about 8% by weight of causticized lignite.

16. The method of claim 15, wherein the thinner composition comprises at least about 15% by weight of causticized lignite.

17. The method of claim 1, wherein the at least one copper salt comprises at least about 1% by weight of copper sulfate in the thinner composition.

18. The method of claim 17, wherein the thinner composition comprises at least about 3% by weight of copper sulfate.

19. The method of claim 18, wherein the thinner composition comprises at least about 5% by weight of copper sulfate.

20. The method of claim 17, wherein the thinner composition comprises from about 1% by weight to about 10% by weight of copper sulfate.

21. The method of claim 20, wherein the thinner composition comprises from about 2% by weight to about 8% by weight of copper sulfate.

22. The method of claim 21, wherein the thinner composition comprises from about 3% by weight to about 7% by weight of copper sulfate.

23. The method of claim 1, wherein the at least one zinc salt comprises zinc sulfate heptahydrate, and wherein the thinner composition further comprises at least about 10% by weight of zinc sulfate heptahydrate.

24. The method of claim 1, wherein the thinner composition has a thinning efficiency of at least about 30%, as measured according to Protocol A.

25. The method of claim 1, further comprising drilling the formation to define or extend the wellbore.

* * * * *

UNITED STATES PATENT AND TRADEMARK OFFICE
CERTIFICATE OF CORRECTION

Page 1 of 1

PATENT NO. : 11,834,594 B2
APPLICATION NO. : 17/407139
DATED : December 5, 2023
INVENTOR(S) : Marshall D. Bishop and Johnie E. Anderson It is certified that error appears in the above-identified patent and that said Letters Patent is hereby corrected as shown below:

On the Title Page

Item (72), Inventors, please correct the spelling of the name of inventor "Johnnie E. Anderson" to read as -- Johnie E. Anderson --.

Signed and Sealed this
Second Day of September, 2025

Coke Morgan Stewart
*Acting Director of the United States Patent and Trademark Office*